United States Patent [19]
Owen

[11] Patent Number: 5,670,989
[45] Date of Patent: Sep. 23, 1997

[54] COMMUNICATIONS AUXILIARY MODULE

[76] Inventor: David B. Owen, 11513 River Dr. East, Carmel, Ind. 46033

[21] Appl. No.: 435,753
[22] Filed: May 5, 1995
[51] Int. Cl.⁶ .................................................. G09G 5/08
[52] U.S. Cl. .................. 345/163; 242/378.4; 242/379; 141/12.2 R
[58] Field of Search ................................ 345/163–167, 345/156, 157; 242/378.4, 379; 191/12.2 R, 12.4

[56] References Cited

U.S. PATENT DOCUMENTS

| | | | |
|---|---|---|---|
| 3,815,078 | 6/1974 | Fedrick | 191/12.4 |
| 4,735,377 | 4/1988 | Zuehsow | 242/379 |
| 5,535,960 | 7/1996 | Skowronski et al. | 242/378.4 |

*Primary Examiner*—Michael H. Lee
*Attorney, Agent, or Firm*—Robert A. Spray, Patent Attorney

[57] ABSTRACT

An auxiliary module for computer apparatus providing the basic function of an organizer as to the slack or excess wad of cord which connects the mouse roll-around input device to the computer. In one form it provides a can-like shell releasably held over an upright spool-like spindle, the shell and spindle being movably and releasably held together for the user to manage the lengthy strip of excess cord, the shell both retaining and concealing the excess cord; and in another embodiment the cord is kept interiorly of a body member by lipped flanges carried by a spindle portion of the body member, all yielding both attractiveness of the work area and avoidance of the bother by the mouse cord as the mouse is manipulated in its use of controlling the computer screen's pointer or curser feature.

13 Claims, 7 Drawing Sheets

COMMUNICATIONS AUXILIARY MODULE

I. FIELD AND BACKGROUND OF THE INVENTION

The present invention relates to computer apparatus, with particular reference to accessory equipment used with computer apparatus.

More particularly the present invention relates to computer accessories conventionally referred to as a "mouse"; and the invention relates to a problem in the use of a mouse.

In the use of the term "mouse", particular reference is made to the movable body which typically is used to control a reference marker or arrow on a visual screen of a computer installation; and the expression "mouse" has been widely adopted by manufacturers and users of computer equipment, presumably because the general shape of the movable "mouse" body, a shape somewhat generally corresponding to that of a mouse or a rectangular block of that general size.

As typically constructed, the mouse has an overall housing of only a few inches in length, for ease of manual holding and manipulation.

Typically it includes as basic units two control wheels and an actuator roller, the roller serving to impart revolving motion to one or both of the control wheels corresponding to the component of motion imparted to the actuator roller as the user moves the mouse body over a convenient friction plate which commonly is called a mouse "pad".

In a typical use, the user will be looking at the computer screen, and particularly at the image of the reference marker or arrow appearing on the screen; and by moving the mouse in a translatory manner the friction from the pad causes the actuator roller to move, correspondingly moving one or both of the control wheels; and the control wheels, being on axes of 90° divergency, are electronically connected to the computer in such a manner and with such circuitry that the reference image or arrow moves horizontally (as an "X"-abscissa movement) and/or vertically (as a "Y"-ordinate movement).

The mouse is connected to the computer by a multiple-strand cord, by which the mouse receives electrical energy from the computer and inputs electrical energy to the computer according to the controlled movement of the mouse as described above.

II. PROBLEMS INHERENT IN THE USE OF A MOUSE AS AN ACCESSORY TO COMPUTER EQUIPMENT; AND PRIOR ART PROBLEMS

The mouse's equipment is obtainable as an accessory to the computer; and, because of a wide variety of installation situations, the typically-furnished connection cord between the mouse and the computer is purposely made with slack, i.e., longer than the typical use in many situations.

The excess slack in the cord is quite a nuisance, because, in the movement of the mouse, the corresponding movement of the cord is liable to knock over or otherwise bother whatever is sitting on the support table for the mouse pad.

More particularly, for many computer-use operations, the mouse input device with a mouse pad is by far the most widely used computer input device other than the computer keyboard. Because of its purpose, to move the pointer arrow or curser on the screen and to initiate and control its movability, the mouse input device needs maneuvering room which is provided by the mouse pad.

The mouse pad also provides the necessary friction resistance so that the roller on the mouse underside will roll without skidding. It is a commonly known problem that the free, i.e., slackscord sitting on the desktop tangles up and causes problems, from merely annoyance to compromised movement and improper functioning of the mouse.

The typical condition is that the input mouse cord lays haphazardly on the desktop, and often gets tangled up with other objects normally residing on the desktop. Also the wad of cord has a spring effect which hinders the smooth movement of the mouse. The wad of excess cord also takes up needed desktop area.

To try to deal with this problem, there have been cordless mouse input devices marketed, but the high cost and compromised functioning of the devices make them less popular for the desktop environment, even though admittedly they excel in presentations where the computer user is several yards away from the computer itself.

Two products of which the present inventor is aware show the recognition of the problem of the excess cord slack's floppy bothersomeness, and they set forth hopeful corrective facilities which, although not of the nature or advantage of this invention, may be said to illustrate prior art attempts, basically by merely elevating the cord's juncture with the mouse pad.

One such product is a "MouseKlip"™ which is a cord-elevating device which clips on the mouse pad. Although having some virtue it has some disadvantages as follows:

1. It consumes area on the mousepad.
2. Its mouse cord elevation function is compromised by its low juncture point where the mouse cord clips on the MouseKlip™.
3. Its free cord management function is also compromised by the MouseKlip's inability to be moved on the desktop in relation to the mousepad.
4. The MouseKlip™ does not change the length of the cord.
5. The MouseKlip™ does not conceal the excess cord.

(Commercially available it is Model 33000, sold by American Covers, Inc., Computer Accessories, P.O. Box 987, Draper, Utah, USA 84020.)

Another such product is "Mouse Arena" ™ sold by Forminco, 9610A Ignance, Brossard, Quebec, Canada, J4Y2R4, and noting it as a U.S. Pat. No. 5,203,845.

It also has some virtue, but it has disadvantages as follows:

1. The wrist/palm rest consumes area on the mousepad.
2. It requires that its mousepad be used.
3. Its mouse cord elevation device is compromised by its complicated procedure for mating it with the mouse cord which requires a screwdriver and two hands.
4. Its free cord management function is also compromised by the Mouse Arena's inability to be moved on the desktop in relation to the mousepad.
5. The Mouse Arena™ does not change the length of the cord.
6. The Mouse Arena™ does not conceal the excess cord.

Alternative types of input devices such as trackball systems and QuePoint type devices (MicroQue, ph. 801-263-1883) marginally compete against the mouse and pad input device in the desktop environment. In numerous advertisements for trackball input devices, the problem of tangled mouse cords is mentioned. One of the advantages of the trackball input device is that it is not a roll-around input device and it does not require the "free cord" length that a mouse and pad input device does. The disadvantage of the trackball and the reason it is not as popular in the desktop environment seems to be that it is not as maneuverable as a mouse and pad input device.

The Communications Auxiliary Module can be used to manage other miscellaneous cords and wires lying on the computer desktop area, but it seems to be more specifically designed for the mouse and pad input device because the movement of the mouse requires a "free cord" length for maneuvering. However, it is precisely this requirement for a "free cord" length which causes the cord to wad up and which causes the cord to tend to get tangled up with other objects on the desktop. Both undesirable aspects also compromise the movement ability of the mouse.

III. SUMMARY OF THE INVENTION'S CONCEPTS

In carrying out the invention, the computer apparatus is provided with an auxiliary module which in its basic function may be described as an "organizer", because it provides for spooling and effectively managing usually a "wad" of excess cord which connects the mouse roll-around input device to the computer.

Although by hindsight appearing to be a simple combination of features and components the organizer as an auxiliary module for computer apparatus provides a very useful and specialized task, i.e., attractively and efficiently containing a hand-coiled excess of the cord length provided for operativity of a mouse.

More particularly, in one form it provides a can-like shell, releasably held over an upright spool-like spindle; and the shell and spindle are movably and releasably held together, providing a cord-winding or input mode and a final and cord-storing operational mode.

In one embodiment the cord is kept from unravelling by the shell, which both retains and conceals the excess cord; and in another embodiment the cord is kept from unravelling by lipped flanges carried by the spindle.

All embodiments provide the accomplishment of a clutter-proof work area for attractiveness, for avoidance of bother by the mouse cord as the mouse is manipulated, and in many cases, for increasing productivity; for in use of the mouse the constant, rapid, and sometimes jerky movement of the mouse causes its connecting cord to "flop around."

Once the organizer is set up, i.e., once the user has coiled into it the amount of excess or slack cord for the user's particular use-situation, it is likely that no further adjustment or setting, or any maintenance or changing at all, will need to be done.

More details are contained in the detailed description.

IV. PRIOR ART CAPABILITY AND MOTIVATIONS, AS HELPING TO SHOW PATENTABILITY HERE

Even in hindsight consideration of the present invention to determine its inventive and novel nature, it is not only conceded but emphasized that the prior art had many details usable in this invention, details of both capability and motivation, but only if the prior art had had the guidance of the present concepts of the present invention.

That is, it is emphasized that the prior art had/or knew several particulars which individually and accumulatively show the non-obviousness of this combination invention. E.g.:

(a) The prior art has had slack-shortener devices for ropes and cords for many years;

(b) The prior art has long realized the disadvantages of a floppy control cord, for not only a computer mouse but for various other uses of a flexible cord;

(c) It seems likely that many if not most owners of computer apparatus would have realized the need to keep a workplace in a very orderly manner, consistent with the expensive and often-considered prestigious nature of computer equipment;

(d) The ease of tooling for the present invention has surely given manufacturers ample incentive to have made modifications for commercial competitiveness in a competitive industry, if the concepts had been obvious;

(e) The features of the present invention are reasonably likely considered by manufacturers and users to be of such an obvious advantage to computer owners and their friends, that manufacturers and/or users would likely consider services of this invention to have massive sales opportunities to a great multitude of persons; and thus manufacturers and/or users would have been likely to have developed this article if its concepts had been obvious;

(f) The disadvantages of floppy mouse input cords have been of such a likely actual and universal nuisance, personally to a large number of users, that surely one would have created this invention if the concepts had been obvious;

(g) The prior art has always had sufficient skill to make many types of cord-shorteners, more than ample skill to have achieved the present invention, but only if the concepts and their combination had been conceived;

(h) Substantially all of the operational characteristics and advantages of details of the present invention, when considered separately from one another and when considered separately from the present invention's details and non-technical accomplishment of the details, are within the skill of persons of various arts, but only when considered away from the integrated and novel combination of concepts which by their cooperative combination achieves this advantageous invention;

(i) The details of the present invention, when considered solely from the standpoint of construction, are exceedingly simple; and the matter of simplicity of construction has long been recognized as indicative of inventive creativity; and (j) Similarly, and a long-recognized indication of inventiveness of a novel combination, is the realistic principle that a person of ordinary skill in the art, as illustrated with respect to the claimed combination as differing in the stated respects from the prior art both as to construction and concept, is presumed to be one who thinks along the line of conventional wisdom in the art and is not one who undertakes to innovate.

Accordingly, although the prior art has had capability and motivation, amply sufficient to presumably give incentive to the development of a novel and practical device according to the present invention, the fact remains that this invention awaited the creativity and inventive discovery of the present inventor. In spite of ample motivation and capability shown by the many illustrations herein, the prior art did not suggest this invention.

V. PRIOR ART AS PARTICULAR INSTANCES OF FAILURE TO PROVIDE THIS NOVEL DEVICE

In view of the industry motives and capabilities, it may be difficult to realize that the prior art has not projected itself to the combination purpose and achievement of the present invention, even though the need and use of mouses for computers is a widespread daily and quite universal factor, and the computer industry is quite commercial and competitive. Further, computer users surely include an uncountable multitude of inventors and other persons, at least of sufficient experience, skill, etc., that the present invention would have been desired and attempted, and perhaps achieved, long ago, but only if its factors and combination-nature had been obvious.

The consideration of a nature of the present inventive concepts will be helped by a consideration of the prior art cited.

As to shortening or storage as a function or capability, nothing is here asserted to be novel; and, in contrast, the concepts of the present invention provide the building upon the principal nature and function of earlier cord-shorteners and storage concepts, rather than any modification of the cord-shortener function itself/themselves.

VI. SUMMARY OF THE PRIOR ART'S LACK OF SUGGESTIONS OF THE CONCEPTS OF THE INVENTION'S COMBINATION

In spite of all such factors of the prior art, the problem here solved awaited this inventor's consideration, ideas, and creativity. More particularly as to the novelty here of the invention as considered as a whole, the resume of the prior art uses and needs helps show its contrast to the present concepts, and emphasizes the advantages, novelty, and the inventive significance of the present concepts as are here shown, particularly as to utility and convenience of use as detailed herein, as to apparatus and as to a procedure.

Moreover, prior art articles known to this inventor, which could possibly be adapted for this duty, fail to show or suggest the details of the present concepts as a combination; and a realistic consideration of the prior art's differences from the present concepts of the overall combination may more aptly be described as teaching away from the present invention's concepts, in contrast to suggesting them, even as to a hindsight attempt to perceive suggestions from a backward look into the prior art, especially since the prior art has long had much motivation as to details of the present invention and as to its provisions.

And the existence of such prior art knowledge and related articles embodying such various features is not only conceded, it is emphasized; for as to the novelty here of the combination, of the invention as considered as a whole, a contrast to the prior art helps also to remind both the great variety of the various prior art articles and needed attempts of improvement, and the advantages and the inventive significance of the present concepts. Thus, as shown herein as a contrast to all the prior art, the inventive significance of the present concepts as a combination is emphasized, and the nature of the concepts and their results can perhaps be easier seen as an invention.

Although varieties of prior art are conceded, and ample motivation is shown, and full capability in the prior art is conceded, no prior art shows or suggests details of the overall combination of the present invention, as is the proper and accepted way of considering the inventiveness nature of the concepts.

That is, although the prior art may show an approach to the overall invention, it is determinatively significant that none of the prior art shows the novel and advantageous concepts in combination, which provides the merits of this invention, even though certain details are shown separately from this accomplishment as a combination.

And the prior art's lack of an invention of an economical take-up feature achieving the convenience, ease of installation, ease of use, simplicity of use, and other advantages of the present invention, which are goals only approached by the prior art, must be recognized as being a long-felt need now realized.

Accordingly, the various concepts and components are conceded and emphasized to have been widely known in the prior art as to various devices; nevertheless, the prior art not having had the particular combination of concepts and details as here presented and shown in novel combination different from the prior art and its suggestions, even only a fair amount of realistic humility to avoid consideration of this invention improperly by hindsight, requires the concepts and achievements here to be realistically viewed as a novel combination, inventive in nature. And especially is this a realistic consideration when viewed from the position of a person of ordinary skill in this art at the time of this invention, and without trying to reconstruct this invention from the prior art without use of hindsight toward particulars not suggested by the prior art.

VII. BRIEF DESCRIPTION OF THE DRAWINGS

The above description of the novel and advantageous invention is of somewhat introductory and generalized form. More particular details, concepts, and features are set forth in the following and more detailed description of illustrative embodiment, taken in conjunction with the accompanying Drawings, which are of somewhat schematic and diagrammatic nature for showing the inventive concepts; and in the Drawings:

FIG. 1 is a schematic pictorial view of the overall computer apparatus environment, illustrating the computer as a non-moving central body assembly, a movable mouse, and a communication auxiliary module of the present invention, the module shown as placed on an associated supporting surface and the mouse placed on an associated friction surface, and segments of an electronic cord, an input segment shown as extending between the mouse and the module, and an output segment extending between the module and the computer apparatus;

FIG. 2 is a vertical cross-sectional view of the module according to a 1st Embodiment;

(In FIGS. 2 and 3, the U-shaped dashed line near the top of the Drawing schematically represents the casing's input opening, hidden in the background, i.e., rearwardly of the spindle, and also the casing's output opening in the foreground of the view.)

VIII. DETAILED DESCRIPTION OF THE INVENTIVE EMBODIMENTS

Figure 1:
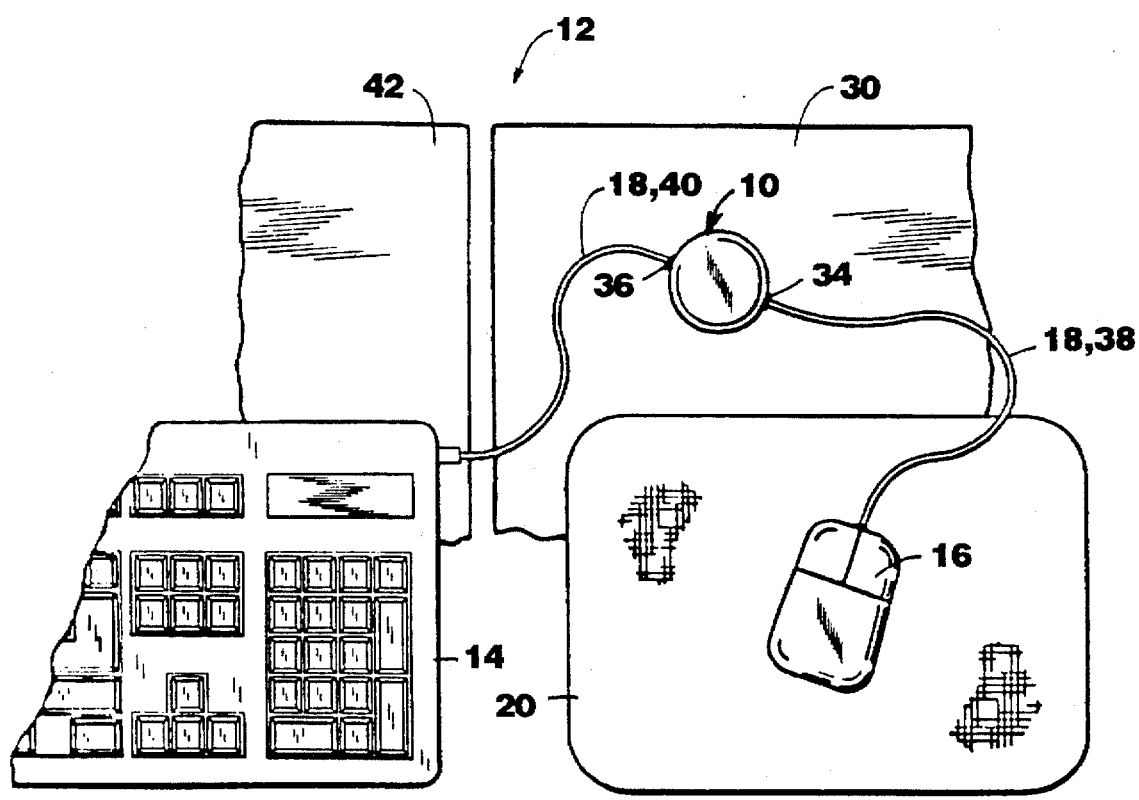

The Drawings show several embodiments of a communications auxiliary module 10, for use with computer apparatus 12 of a conventional form having a generally non-moving central body assembly 14 and a movable control mouse 16.

As with conventional computer apparatus 12/14, the apparatus includes a flexible and electronically active cord 18 operatively inter-connecting them for electronic communication which relates to the control mouse 16's operativity of being manually manipulated to traverse over an associated friction pad surface 20 to give input signals to the central body assembly 14 by the control mouse's operativity.

The apparatus as so far described in this numerical description is quite conventional, except for the module 10 of the present invention.

In a 1st Embodiment (FIG. 2) the module 10A is shown as comprising a spindle 22 and a casing 24; and the casing 24 is shown provided with a hollow interior wall 26 of a coordinated size, i.e., the casing interior wall 26 is such that casing 24 may be placed in an ensleeving manner over the spindle 22, and, when so placed, it will loosely ensleeve the spindle, leaving an annular space 27 between the spindle 22 and the casing 24's wall 26.

Figure 2:
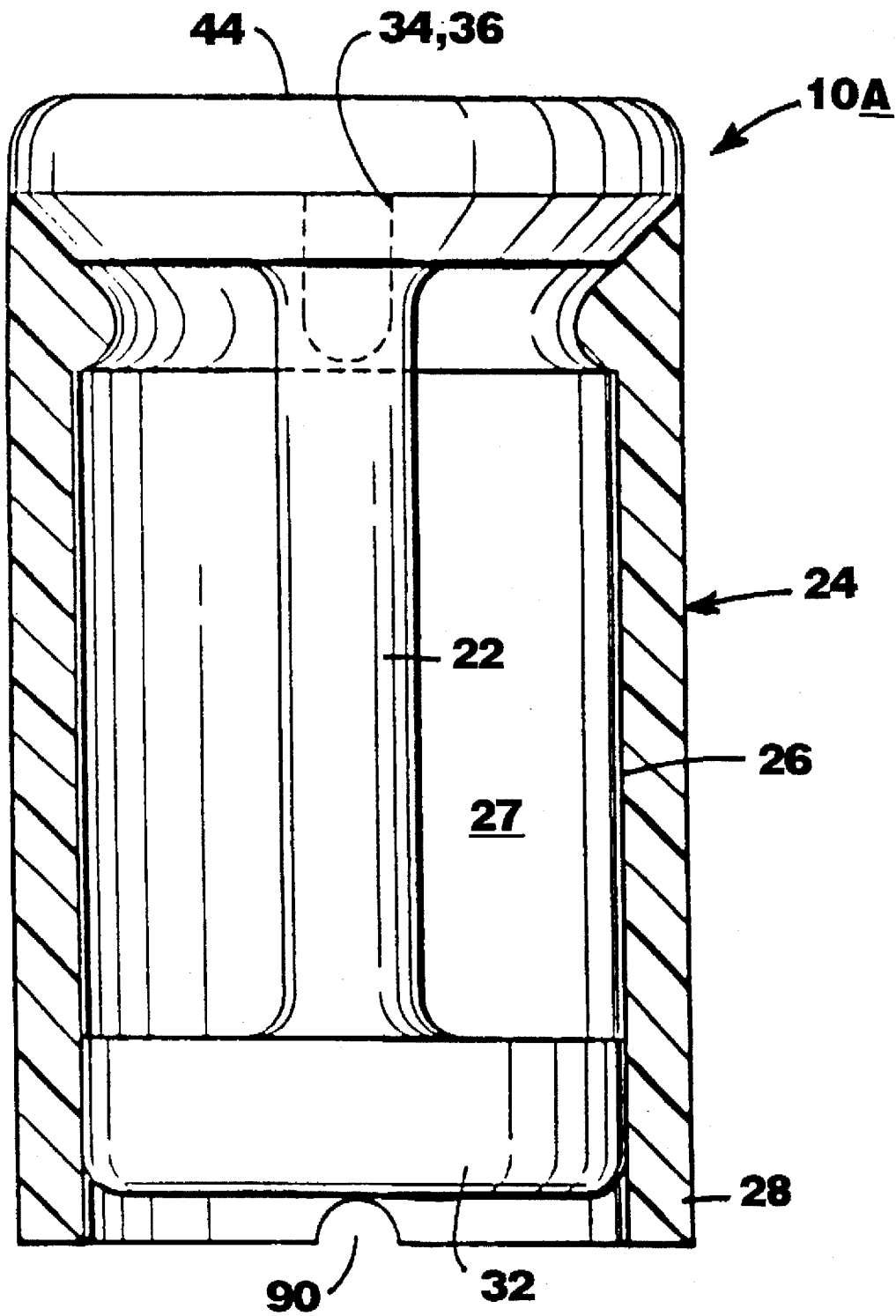
Figure 3:
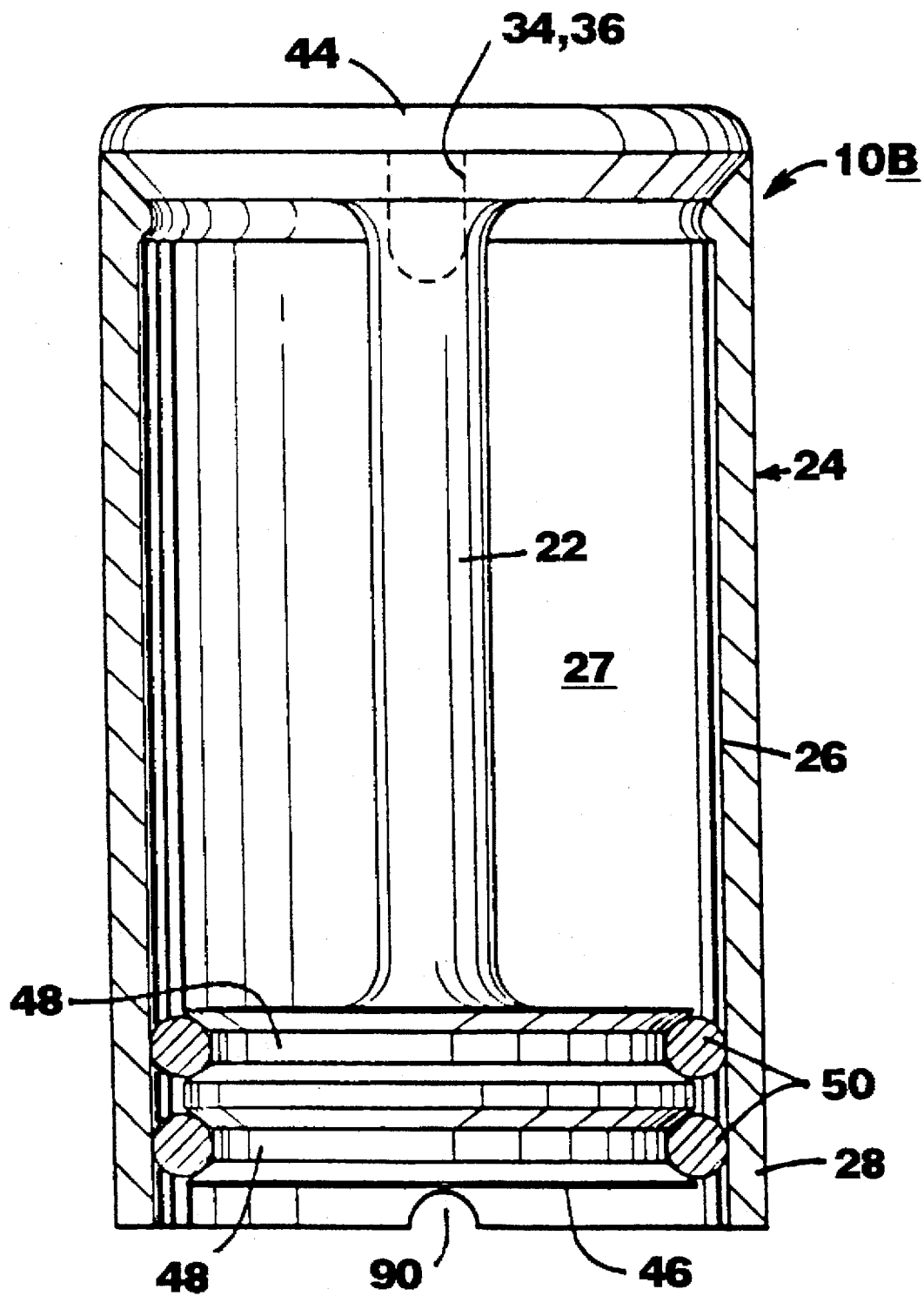
FIG. 3 is a vertical cross-sectional view of the module according to a 2nd Embodiment.

There is provided a base means 28 on the casing 24 for supporting the spindle 22 on an associated supportive surface 30, the base means 28 shown in FIGS. 2 and 3 as frictionally supporting the lower end 32 of the spindle 22, which is axially movable in the casing's interior region 27 bounded by wall 26.

The casing 24 is shown as provided with an input opening 34 and an exit opening 36, accommodative of the cord 18, particularly the input segment 38 of the cord 18 in the input opening 34 and the output segment 40 of the cord 18 in the output opening 36.

The size of the hollow interior annular chamber 27 within the wall 26 of the casing 24 is, in comparison to the size of the spindle 22, such that a plurality of loops of the cord 18 may be releasably retained between the outer surface of the spindle 22 and the interior surface 26 of the casing's interior chamber 27; and thereby is provided the means for a temporary length changer effect for the cord 18, and minimizing the likelihood of the cord's movement, during the mouse 16's manipulation, being bothersome to the computer apparatus' 12/14 environment.

Usually most of the extra cord so packaged into the module 10 would be the purposely excessive length of the output cord segment 40, for the manufacturer purposely provides excess cord to accommodate a variety of use situations; and the length of the input cord 38 is not likely to be significantly shortened, because there will be an inherent amount of slack with a minimum of floppiness between the storage module 10 and the mouse pad 20.

The casing 24 is provided with an overall shape and nature such that, in retaining the loops of the cord 18, the casing 24 both conceals them and provides a region which releasably retains them, achieving the cord-shortening effect with minimum effort and with no permanent disfigurement of the cord 18.

The cord 18, when so modified in length, can provide all its control operativity, i.e. guidance instruction for the computer screen's pointing device in response to the user rolling the mouse on the mouse pad 20, moving the cursor around the computer 14's screen, or perform other operativity such as the user actuating controls (e.g., clicking buttons) on the mouse 16, or otherwise controlling the computer 14 (often referred to as "telling the computer what to do").

In use, as typified by the work site schematically shown in FIG. 1, the computer apparatus 14 is supported on an associated supportive desk or table top 42 or 30 (schematically shown in FIG. 1 as being two different surfaces 30 and 42), a desk or table top 42/30 also supporting the base means 28.

As shown in FIGS. 2 and 3, the input opening 34 is substantially spaced from the base means 28; and this assures that the input cord portion 38 which is adjacent the casing 24 will be substantially removed from the associated desk or table top 30, lessening the chance of the input cord segment 38 bothering objects sitting on the surface 30 during movement of the mouse 16.

With certain types and lengths of cord 18, it may be possible to achieve a satisfactory nature of storage of cord 18 within the casing's interior 27, without wrapping the cord 18 around a spindle 22; and in this case the spindle 22 may be omitted or merely used as a carrier for a cap body 44 which is used to cover the casing 24.

With all embodiments, it is preferable that the casing 24, with or without a cap 44, is such that the casing 24 has an overall shape and nature such that, in retaining the loops of the cord 18 within the casing interior 27, the casing 24 both conceals the packaged cord 18 and provides a region which releasably retains the unused slack portion of the cord 18.

The inventive concepts pertain to whatever is the nature and purpose of the connection cord 18, although typically with the present state of the art the cord will be some sort of an information transfer cord.

E.g., the cord will be operable to transmit factual information data, especially information organized for analysis or used to reason or make decisions, generally numerical or other information represented in a form suitable for processing by a computer, values derived from scientific experiments, etc.

In employing the concepts in the various embodiments, details shown in the Drawings supplement the basic concept of a casing 24 with input opening 34 and output opening 36 both leading to a hollow interior 27 of the casing 24.

Thus, i.e., the difference between the 1st Embodiment (FIG. 2) body 10A, and body 10B of the 2nd Embodiment (FIGS. 3 and 5) is that an integral portion of the base portion 32 of the spindle 22 bears frictionally against the interior casing wall 26 of body 10A in FIG. 2, whereas the spindle base 46 of body 10B in FIG. 3 is provided with annular grooves 48 with resilient O-rings 50 which frictionally bear against the casing 24's interior wall 26.

The vertical movability of the spindle 22 in both FIGS. 2 and 3/5 provides that the spindle 22 may be raised upwardly with respect to the casing 24, and resiliently but stably held by friction in an upraised position while loops of the cord 18 are being wound around the spindle 22, in the task of packaging the unused slack portion of the cord 18, in space 27.

In body 10C (the 3rd Embodiment, FIG. 4), there are two casing portions, one being an upper casing portion 52 and a lower one being a lower casing portion 54, both of a generally cylindrical form.

Figure 4:
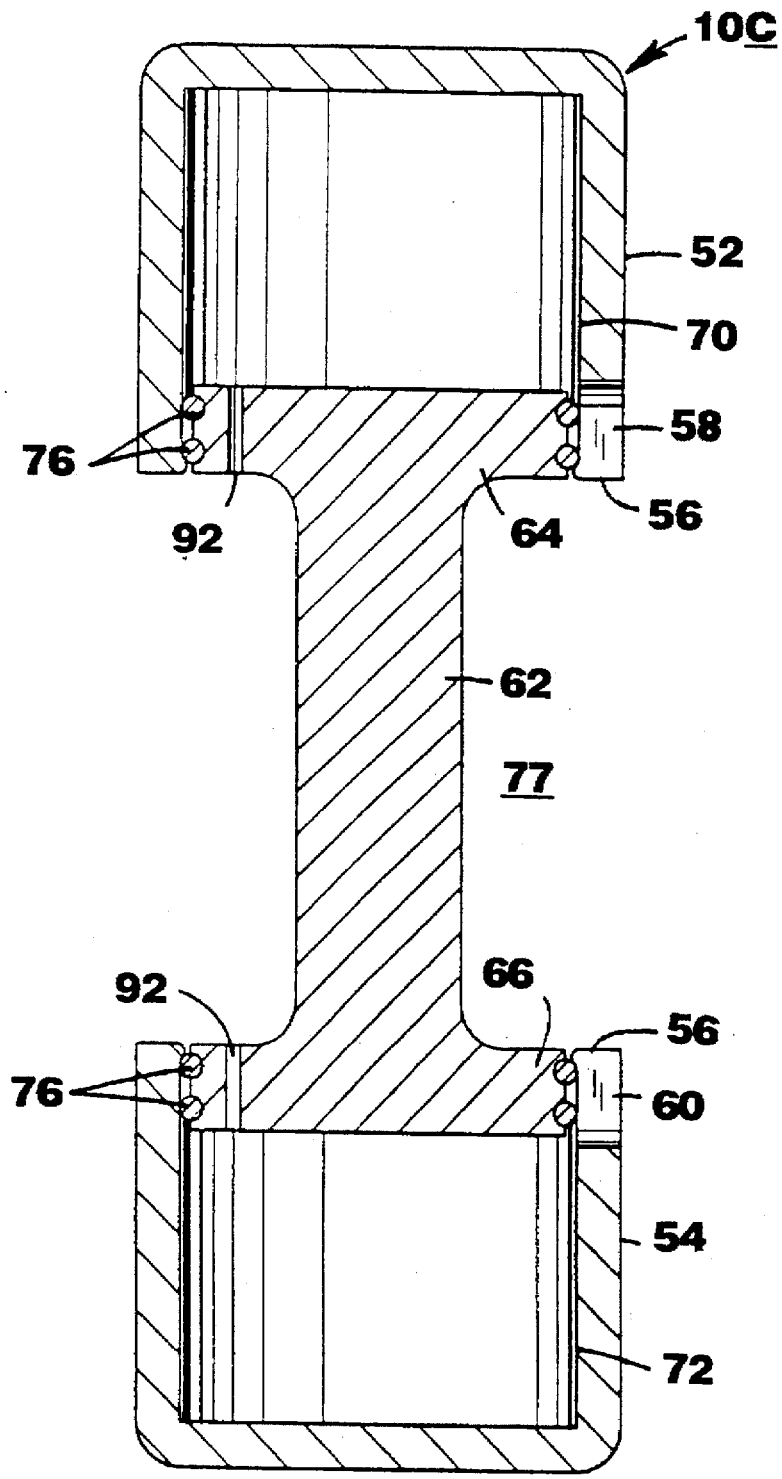
FIG. 4 is a vertical cross-sectional view of the module according to a 3rd Embodiment, its two casing-portions shown as in open or assembly condition prior to wrapping excess cord loops around the spindle.

Adjacent edges 56 of both casing portions 52 and 54 are recessed to provide openings which respectively provide an input opening 58 and an output opening 60 for passage of the excess or slack cord 18 which has been wound around the spindle 62 whose top flange portion 64 and bottom flange portion 66 are received respectively in the hollow interior 70 and 72 of casing portions 52 and 54, enabling the casing portions 52 and 54 to be slid together from their spaced-apart condition shown in FIG. 4, which is their spaced-apart condition while the user is wrapping loops of the cord 18 around the spindle 62.

Figure 5:
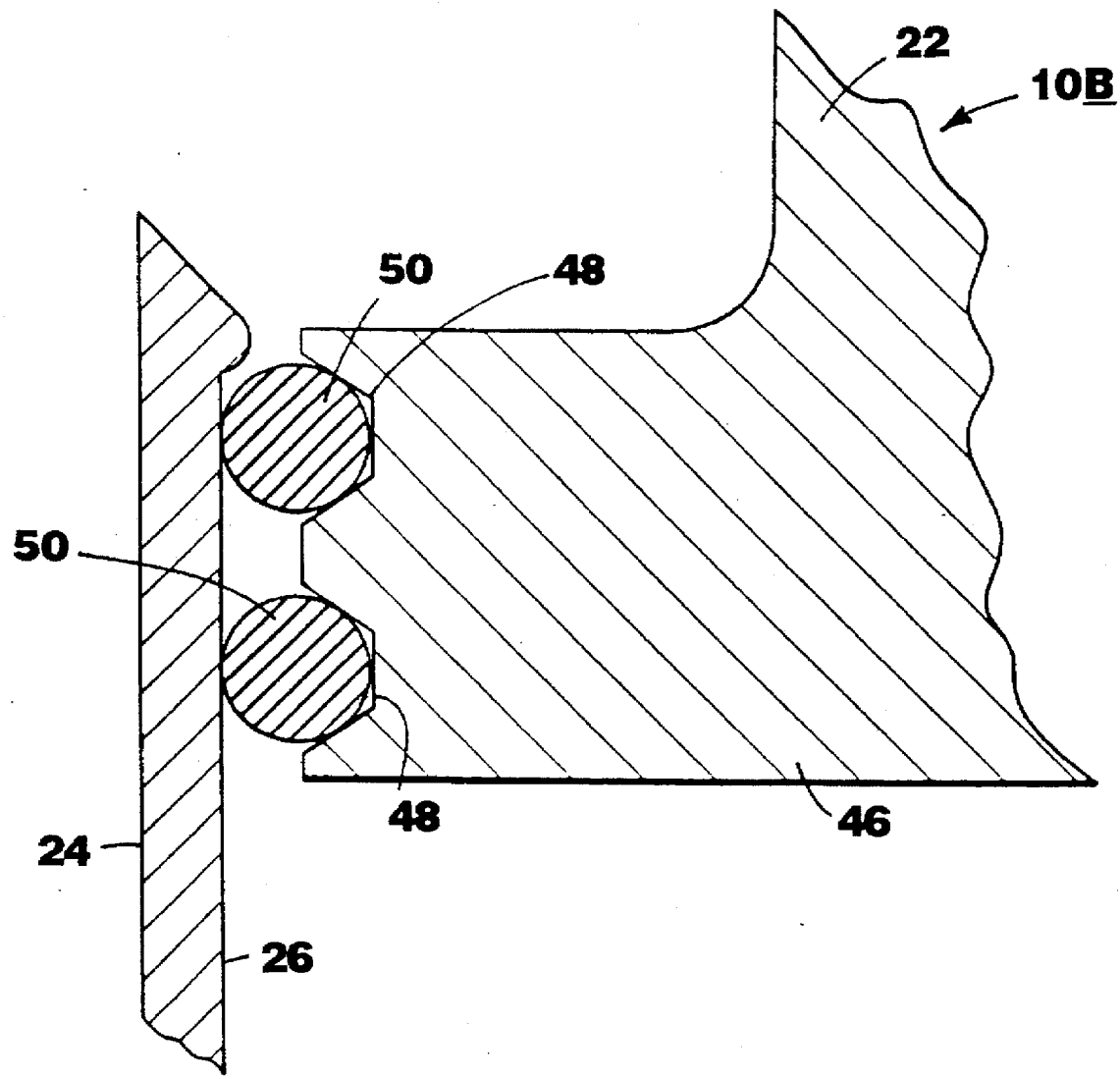
FIG. 5 is an enlarged cross-sectional detail view of a portion of the 2nd Embodiment shown in FIG. 3, for illustrating the frictional retention of the spindle and its base by the casing.

As with the embodiment shown in FIGS. 3 and 5, the spindle 62 of FIG. 4 (body 10C) and the corresponding casing portions 52/54 are frictionally retained in their FIG. 4 position by O-rings 76.

Each of the casings 52/54 is provided with an opening 58/60 for the entrance and exit respectively of the cord 18, and the movability of the casings 52/54 with respect to the spindle 62 provides that the casings 52/54 will conceal the cord 18 wrapped around the spindle 62.

Of cylindrical shape, the casings 52/54 are of a size such that their inner walls 70/72 movably receive the outer portion of the spindle's flanges 64/66; and when the casings 52/54 are positioned receiving the spindle's flanges 64/66, and when the casing walls 56 are adjacent one another, there is an annular space 77 between the spindle 62 and the casing walls 0/72, which space 77 receives the cord 18 for its effect of shortening the cord 18 for the described purpose of minimizing the bothersomeness of the cord's slack.

Figure 6:
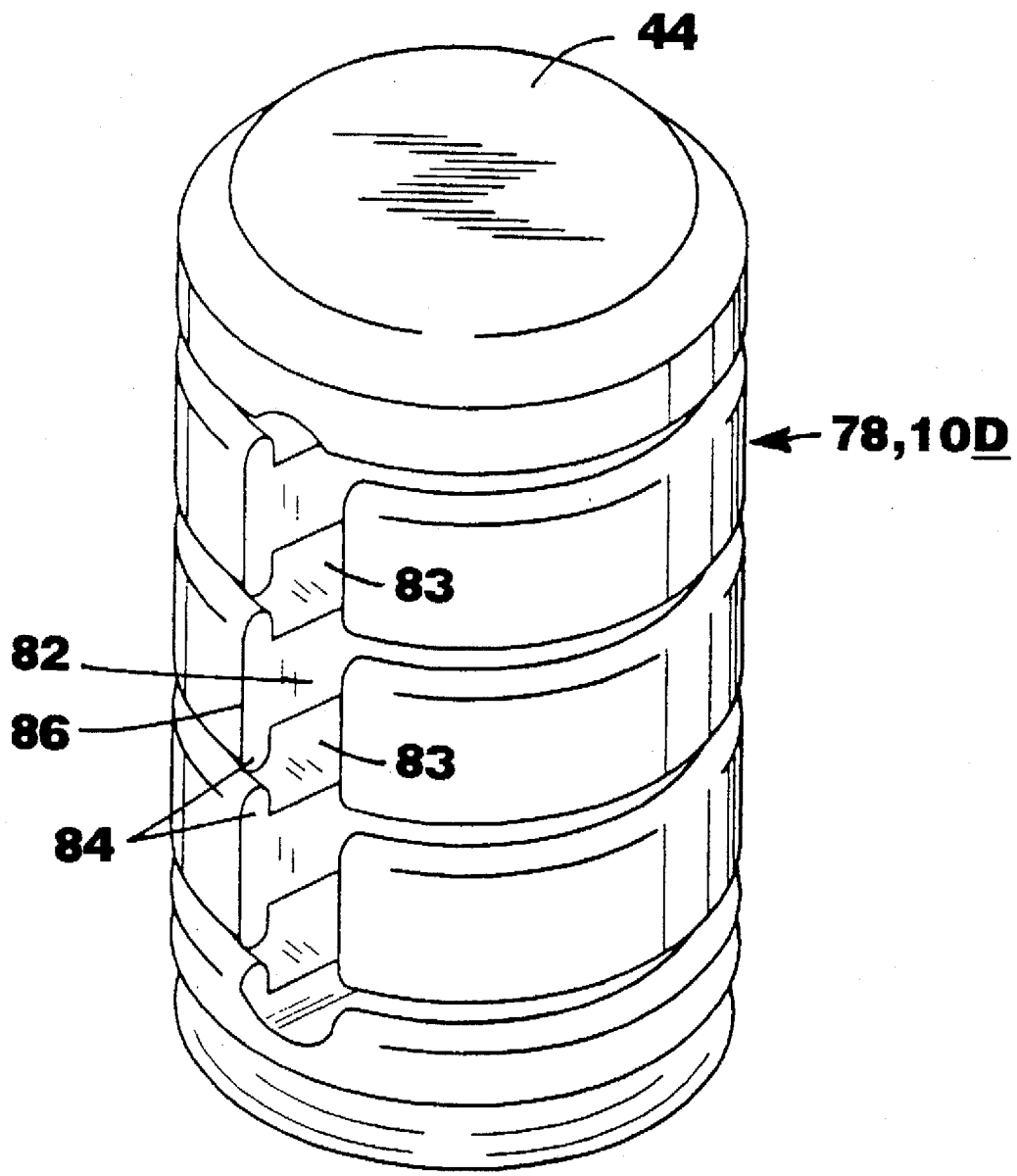
FIG. 6 is a pictorial view of a module according to a 4th Embodiment, illustrating its appearance prior to the wrapping thereon of the electronic cord.
Figure 8:
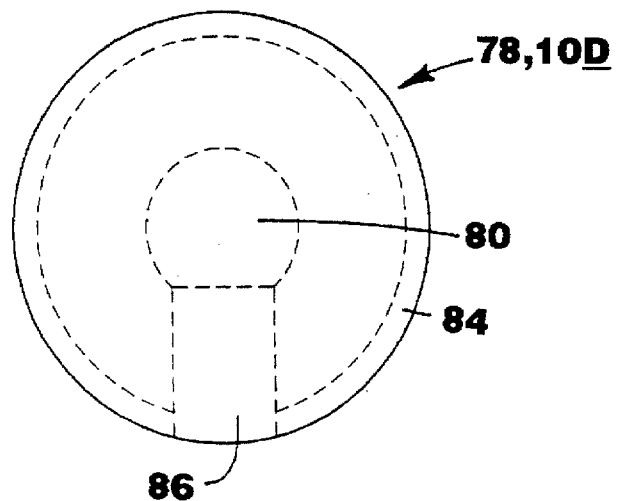
FIG. 8 is a top view of the module of the 4th Embodiment.
Figure 7:
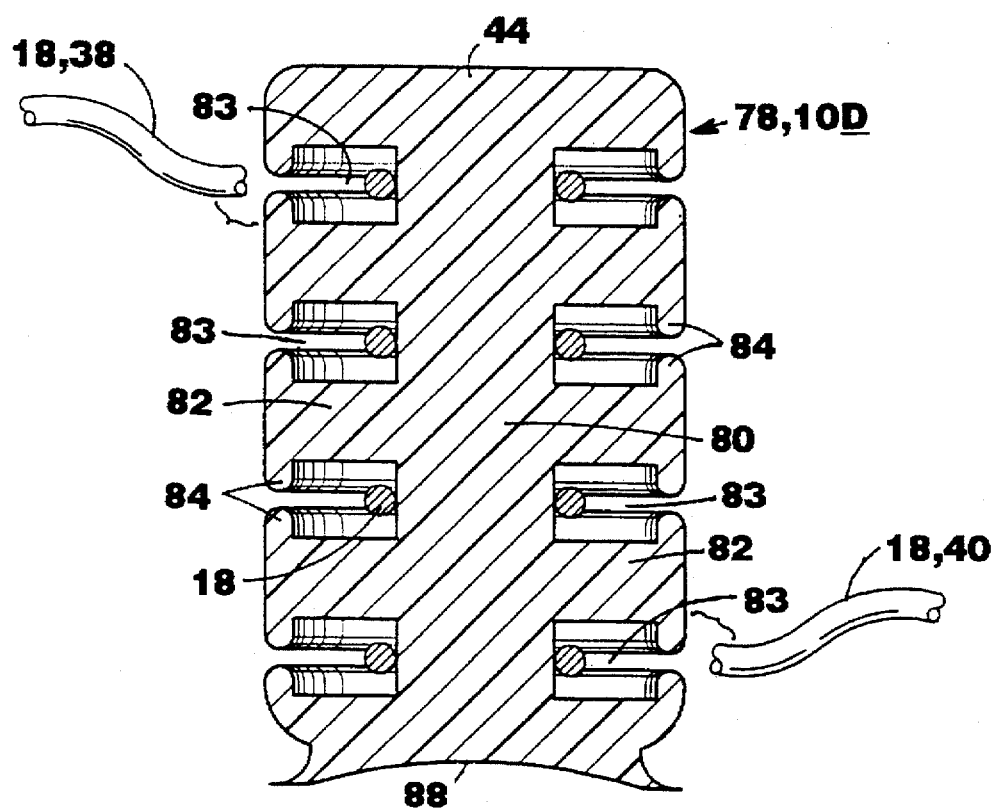
FIG. 7 is a vertical cross-sectional view of a module of the 4th Embodiment, portions of the input segment of the cord and of the output segment of the cord shown diagrammatically, and with portions of the electronic cord illustrated as wrapped around the spindle portion of the module.

In the 4th Embodiment (body 10D, FIGS. 6–8), the parts which in the other embodiments correspond to the spindle 22 and casing 24 are shown in FIGS. 6–8 to be of an integrally molded formation 78 (body 10D), preferably of a resilient plastic or rubber material.

More particularly, the overall body 78 of the 4th Embodiment (FIGS. 6–8) is shown as formed integrally by a central spindle 80 from which extends radially outwardly an axial series of a plurality of annular flanges 82, between adjacent ones of which flanges 82 is provided an annular recess 83 into which may be wound a portion of the cord 18.

The annular flanges 82 are provided along an outward portion thereof with a lip 84 which provides a narrower space between adjacent flanges 82 than radially inwardly thereof, the spacing between lips 84 being slightly less than the diameter of the cord 18, thus providing that the cord 18 when wrapped around the spindle 80 is retained after temporary deformation of either or both of the cord 18 and the flanges 82, which deformation occurs as cord 18 is forced between adjacent lips 84.

The flanges 82 are not fully circumferentially continuous, but instead are provided with a throat opening 86 which performs as an input opening 34 and output opening 36 of the other embodiments, here of cord input 38 and cord output 40, and which performs the function of allowing the cord to be wound in a manner by which it skips from one to the next annular recess 83 without breaching the generally smooth-appearing exterior of the module 10D.

The body 78 (FIG. 7) is shown as having its bottom edge 88 recessed, which, by the resilient deformability of the body 10D, provides a vacuum-connection effect of the body 10D upon the associated surface 30. Conversely, in FIGS. 2, 3 and 4 vent openings 90 and 92 are shown, avoiding a difficulty of movement of the casing and the spindle portions of the various embodiments.

IX. SUMMARY OF THE ADVANTAGES

The present invention as detailed herein has advantages in both concept and in component parts and features; for in contrast to other articles known to the inventor as to the prior art mentioned, the invention provides advantageous features which should be considered, both as to their individual benefit, and to whatever may be considered to be also their synergistic benefit toward the invention as a whole. Such features include:

(a) Easy to use, with advantages of both attractiveness of the workplace and avoidance of floppiness of the mouse's input segment, knockover, spills, etc.;

(b) Use is easy to learn;

(c) Economical of formation;

(d) Advantageous slack take-up is provided without cutting the cord or having to attempt a difficult re-attachment of a cord's connector plug, yielding much cord take-up effect in a particular although temporary use-situation, but nevertheless leaving a full length of mouse cord available for a longer-use cord-length need at a subsequent use-situation; and (e) Avoids the cost and storage problem of having to own a plurality of mouse cords.

X. CONCLUSION AS TO INVENTIVE COMBINATION

It is thus seen that a combination type apparatus constructed and used according to the combination of inventive concepts and details herein set forth, provides novel concepts of a desirable and usefully advantageous article and procedure, yielding advantages which are and which provide special and particular advantages when used as herein set forth.

In summary as to the nature of the overall module's advantageous concepts, their novelty and inventive nature is shown by novel features of concept and construction shown here in advantageous combination and by the novel concepts hereof not only being different from all the prior art known, even though extension cords, housings for accommodation of unused materials and components, and shortening devices for ropes and cords, have been known and been used for scores of years, but because the achievement is not what is or has been suggested to those of ordinary skill in the art, especially realistically considering this as a novel combination comprising components which individually are similar in nature to what is well known to most all persons, surely including most of the many makers and users of computers and of mouse accessories for a number of years, throughout the entire world. No prior art component or element has even suggested the modifications of any other prior art to achieve the particulars of the novel concepts of the overall combination here achieved, with the special advantages which the overall combination article provides; and this lack of suggestion by any prior art has been in spite of the long worldwide use of various types of computers and movable mouse-type accessories.

The differences of concept and construction as specified herein yield advantages over the prior art; and the lack of this invention by the prior art, as a prior art combination, has been in spite of this invention's apparent simplicity of the construction once the concepts have been conceived, in spite of the advantages it would have given, and in spite of the availability of all the materials, to all persons of the entire world, and the invention's non-technical and openly-visible nature.

Quite certainly this particular combination of prior art details as here presented in this overall combination has not been suggested by the prior art, this achievement in its particular details and utility being a substantial and advantageous departure from prior art, even though the prior art has had similar components for numbers of years. And particularly is the overall difference from the prior art significant when the non-obviousness is viewed by a consideration of the subject matter of this overall device as a whole, as a combination integrally incorporating features different in their combination from the prior art, in contrast to merely separate details themselves, and further in view of the prior art not achieving particular advantages here achieved by this combination.

Accordingly, it will thus be seen from the foregoing description of the invention according to these illustrative embodiments, considered with the accompanying drawings, that the present invention provides new and useful concepts of a novel and advantageous article and procedure, possessing and yielding desired advantages and characteristics in formation and use, and accomplishing the intended objects, including those hereinbefore pointed out and others which are inherent in the invention.

Modifications and variations may be effected without departing from the scope of the novel concepts of the invention; accordingly, the invention is not limited to the specific embodiments or form or arrangement of parts herein described or shown.

I claim:

1. A communications auxiliary module, for use with computer apparatus having a generally non-moving central body assembly and a movable control mouse, and a flexible and electronically active cord operatively inter-connecting them for electronic communication therebetween relating to the use of the control mouse's operativity of being manually manipulated to traverse over an associated friction surface to give input signals to the central body assembly by the control mouse's operativity, the auxiliary module comprising a spindle and a casing, the casing being provided with a hollow interior whose size is such that it is placed in an ensleeving manner over the spindle, and, when so placed, it will loosely ensleeve the spindle, a base means for supporting the spindle on an associated supportive surface, the casing being provided with an input opening and an exit opening, accommodative of the cord, the size of the hollow interior of the casing being, in comparison to the size of the spindle, such that a plurality of loops of the cord are releasably retained between the outer surface of the spindle and the interior surface of the casing's interior, thus providing temporary length changer effect for the cord, and minimizing the likelihood of the cord's movement, during the mouse's manipulation, being bothersome to the computer apparatus' environment.

2. A communications auxiliary module, for use with computer apparatus as set forth in claim 1, in a combination in which the casing is provided with an overall shape and nature such that, in retaining the said loops of the cord, it both conceals them and provides a region which releasably retains them.

3. A communications auxiliary module, for use with computer apparatus as set forth in claim 1, in a combination in which the electronic cord is an information transfer cord.

4. A communications auxiliary module, for use with computer apparatus as set forth in claim 2, in a combination in which the electronic cord is an information transfer cord.

5. A communications auxiliary module, for use with computer apparatus as set forth in claim 1, in a combination in which the computer apparatus is supported on an associated supportive desk or table top, a desk or table top also supporting the base means.

6. A communications auxiliary module, for use with computer apparatus as set forth in claim 2, in a combination in which the computer apparatus is supported on an associated supportive desk or table top, a desk or table top also supporting the base means.

7. A communications auxiliary module for use with computer apparatus as set forth in claim 5, in a combination in which the input opening is provided to be substantially spaced from the base means, thus assuring that the cord portion adjacent the casing will be substantially removed from the associated desk or table top.

8. A communications auxiliary module for use with computer apparatus as set forth in claim 6, in a combination in which the input opening is provided to be substantially spaced from the base means, thus assuring that the cord portion adjacent the casing will be substantially removed from the associated desk or table top.

9. A communications auxiliary module, for use with computer apparatus having a generally non-moving central body assembly and a movable control mouse, and a flexible and electronically active cord operatively inter-connecting them for electronic communication therebetween relating to the use of the control mouse's operativity of being manually manipulated to traverse over an associated friction surface to give input signals to the central body assembly by the control mouse's operativity, the auxiliary module comprising a spindle and a pair of casings, the spindle having annular flanges outwardly extending from both ends of the spindle, and each casing of the pair of casings having a hollow interior which receives one of the spindle's flanges, respectively, the casings being axially movable with respect to the spindle, each of the casings being provided with an opening for the entrance and exit respectively of the cord, and the movability of the casings with respect to the spindle providing that the casings will conceal the cord wrapped around the spindle.

10. A communications auxiliary module, for use with computer apparatus as set forth in claim 9, in a combination in which the casings are of a generally cylindrical shape, and are of a size such that their walls movably receive the outer portion of the spindle's flanges, and when so positioned receiving the spindle's flanges and adjacent one another provide an annular space between the spindle and the casing walls, which space receives the cord for its effect of shortening the cord for minimizing the likelihood of the cord's movement, during the mouse's manipulation, being bothersome to the computer apparatus' environment.

11. A communications auxiliary module, for use with computer apparatus having a generally non-moving central body assembly and a movable control mouse, and a flexible and electronically active cord operatively inter-connecting them for electronic communication therebetween relating to the use of the control mouse's operativity of being manually manipulated to traverse over an associated friction surface to give input signals to the central body assembly by the control mouse's operativity, the auxiliary module comprising a spindle, with a plurality of annular flanges extending radially therefrom, and providing between adjacent ones of the annular flanges an annular recess into which is wound a portion of the cord.

12. A communications auxiliary module, for use with computer apparatus as set forth in claim 11, in a combination in which the adjacent annular flanges are provided along an outward portion thereof with a lip which provides a narrower space between adjacent flanges than radially inwardly thereof, the spacing being slightly less than the diameter of the cord, thus providing that the cord when wrapped around the spindle is retained within said annular recess.

13. A communications auxiliary module, for use with computer apparatus as set forth in claim 12, in a combination in which the annular flanges and the lips are provided with a throat opening, thus providing an input opening and an exit opening for the cord and providing a means for allowing the cord to be wound from one to the next annular recess without breaching the smooth-appearing exterior of the module.

* * * * *

UNITED STATES PATENT AND TRADEMARK OFFICE
CERTIFICATE OF CORRECTION

PATENT NO. : 5,670,989

DATED : September 23, 1997

INVENTOR(S) : David B. Owen

It is certified that error appears in the above-identified patent and that said Letters Patent is hereby corrected as shown below:

Col. 2, line 2; Change "slackscord" to: -- slack, cord --.

Col. 6, line 27; "embodiment" should be: -- embodiments --.

Col. 9, line 23; Change "0/72" to: -- 70/72 --.

Signed and Sealed this

Twenty-fifth Day of November, 1997

*Attest:*

BRUCE LEHMAN

*Attesting Officer*  *Commissioner of Patents and Trademarks*